US006625860B1

United States Patent
Gernstein

(10) Patent No.: US 6,625,860 B1
(45) Date of Patent: *Sep. 30, 2003

(54) METHOD OF CONVERTING A TRUCK HAVING A RAISED ROOF SLEEPER CAB TO A MID-ROOF CAB

(76) Inventor: Dan H. Gernstein, 16572 Hascall St., Omaha, NE (US) 68130

(*) Notice: Subject to any disclaimer, the term of this patent is extended or adjusted under 35 U.S.C. 154(b) by 10 days.

This patent is subject to a terminal disclaimer.

(21) Appl. No.: 10/026,034

(22) Filed: Dec. 21, 2001

(51) Int. Cl.⁷ .............................................. B21K 21/16
(52) U.S. Cl. ....................... 29/401.1; 29/897.2; 29/416; 29/469; 296/190.02
(58) Field of Search .............................. 29/401.1, 897.2, 29/416, 469, 428, 525.06; 296/190.02, 190.01, 183, 197, 196, 193, 210, 190.08; 180/89.12, 89.19

(56) References Cited

U.S. PATENT DOCUMENTS

| | | |
|---|---|---|
| 3,339,967 A | 9/1967 | Harris |
| 3,558,180 A | 1/1971 | Algire |
| 4,050,735 A | 9/1977 | Molnar |
| 4,315,653 A * | 2/1982 | Sparling ..................... 296/63 |
| 4,589,181 A | 5/1986 | Phillips |
| 4,599,780 A | 7/1986 | Rohrbacher |
| 4,775,179 A | 10/1988 | Riggs |
| 4,787,670 A | 11/1988 | Bentz |
| 4,813,736 A * | 3/1989 | Schubert et al. ....... 296/190.05 |
| 4,842,326 A * | 6/1989 | DiVito ........................ 296/196 |
| 5,000,501 A | 3/1991 | Cunha |
| 5,159,746 A | 11/1992 | Saggese |
| 5,305,512 A | 4/1994 | Ward |
| 5,310,239 A | 5/1994 | Koske et al. |
| 5,560,673 A | 10/1996 | Angelo |
| 5,769,486 A | 6/1998 | Novoa et al. |
| 6,178,612 B1 | 1/2001 | Gernstein |
| 6,390,537 B1 * | 5/2002 | DiGonis ..................... 296/185 |

* cited by examiner

Primary Examiner—Charles T. Jordan
Assistant Examiner—T. Nguyen
(74) Attorney, Agent, or Firm—Thomte, Mazour & Niebergall; Dennis L. Thomte

(57) ABSTRACT

A method of converting a truck raised roof sleeper cab to a mid-roof cab comprising the steps of: providing a truck cab having a raised roof sleeper cab riveted to the upper and rearward ends thereof; removing the rivets which connect the raised roof sleeper cab to the truck cab; removing the raise roof sleeper cab from the truck cab to create an opening at the rearward end of the truck cab and an opening in the roof of a truck cab; providing a rear wall member which resembles the rear wall of a mid-roof cab and which is designed to close the opening in the rearward end of the cab created by the removal of the sleeper cab from the truck cab; securing the rear wall member to the truck cab to close the opening therein; providing a mid-roof member which resembles the roof of a mid-roof cab and which is designed to close the opening created in the roof of the truck cab by the removal of the sleeper cab from the truck cab; and securing the mid-roof member to the truck cab to close the opening in the roof of the truck cab; securing the mid-roof member to the rear wall member whereby the truck has the appearance of a mid-roof cab.

12 Claims, 7 Drawing Sheets

METHOD OF CONVERTING A TRUCK HAVING A RAISED ROOF SLEEPER CAB TO A MID-ROOF CAB

BACKGROUND OF THE INVENTION

1. Field of the Invention

This invention relates to a method of converting a truck having a raised roof sleeper cab to a mid-roof cab. More particularly, the invention relates to a method whereby a truck cab having a raised roof sleeper cab mounted thereon is converted to a mid-roof cab by removing the sleeper cab from the truck cab and replacing the same with a rear wall member and a raised roof member so that the modified truck cab is a mid-roof cab rather than a raised roof sleeper cab.

2. Description of the Related Art

Many of the trucks which haul freight across the nation include a sleeper cab mounted on the truck cab so that the driver may, at appropriate times, sleep in the sleeper cab. The truck cabs which include sleeper cabs are quite large and do serve a very useful purpose while the truck is being used for long hauls. However, the trucks having the truck sleeper cabs are normally removed from long haul service after two or three years due to the expiration of leases, large accumulated mileage, etc. When the trucks having sleeper cabs are removed from long haul service, and are being sold as a used truck, an operator is hesitant to purchase the same for further long haul use due to the normally high mileage thereon. Further, if the trucks having sleeper cabs are to be used for local routes, those trucks, due to the large cab size thereof, are not well-suited for local use. In applicant's earlier application, a method is described for converting a truck cab having a sleeper compartment to a "day cab" truck cab due to the fact that a truck cab without a sleeper compartment normally has a much larger resale value than truck sleeper cabs.

Another type of a truck cab having a sleeper compartment associated therewith is one which is known as a raised roof sleeper cab or a condo sleeper cab. The raised roof sleeper cab includes a raised roof portion which is positioned over the top of the truck cab and a sleeper compartment which is positioned at the rear of the truck cab. A further type of truck cab is one which known as a mid-roof truck cab wherein additional storage space and headroom is provided in the cab as compared to a conventional day cab. The mid-roof truck cabs provide the desirable headroom and storage space within the truck cab, but still permit the truck to enter door openings which would not otherwise accommodate a raised roof sleeper cab.

SUMMARY OF THE INVENTION

The method of converting a truck having a raised roof sleeper cab to a mid-roof cab is described which comprises the steps of: (1) providing a truck cab having a raised roof sleeper cab including a raised roof positioned above the truck cab and a sleeper cab positioned rearwardly of the truck cab with the raised roof being secured to the sleeper cab; (2) removing the rivets which connect the raised roof sleeper cab to the truck cab; (3) removing the raised roof sleeper cab from the truck cab, thereby creating a first opening at the rearward end of the truck cab and a second opening in the roof of the truck cab; (4) providing a rear wall member which resembles the rear wall of a mid-roof cab and which is designed to close the first opening created at the rearward end of the truck cab; (5) securing the rear wall member to the truck cab to close the first opening; (6) providing a mid-roof member which resembles the roof of a mid-roof cab and which is designed to close the second opening created in the roof of the truck cab; (7) securing the mid-roof member to the truck cab to close the second opening; and (8) securing the mid-roof member to the rear wall member whereby the truck cab has the appearance of a mid-roof cab. The rear wall member is riveted to the truck cab and has a window provided therein. The mid-roof member and the rear wall member are riveted to the truck cab and are riveted to each other.

It is a principal object of the invention to provide a method of converting a truck having a raised roof sleeper cab to a mid-roof cab.

Still another object of the invention is to provide a method of converting a truck raised roof sleeper cab to a mid-roof cab wherein the resultant mid-roof cab closely resembles conventional mid-roof cabs.

Still another object of the invention is to provide a method of converting a truck raised roof sleeper cab to a mid-roof cab wherein a fiberglass rear wall member is used to close the opening created at the rear of the cab by the removal of the sleeper cab and wherein a fiberglass mid-roof member is used to close the opening created by the removal of the raised roof sleeper cab.

Still another object of the invention is to provide a method of converting a truck raised roof sleeper cab to a mid-roof cab which enhances the value of the used truck.

Still another object of the invention is to provide a method of converting a truck raised roof sleeper cab to a mid-roof cab so that the resultant cab is more suited for local use.

These and other objects will be obvious to those skilled in the art.

DESCRIPTION OF THE PREFERRED EMBODIMENT

Figure 1:
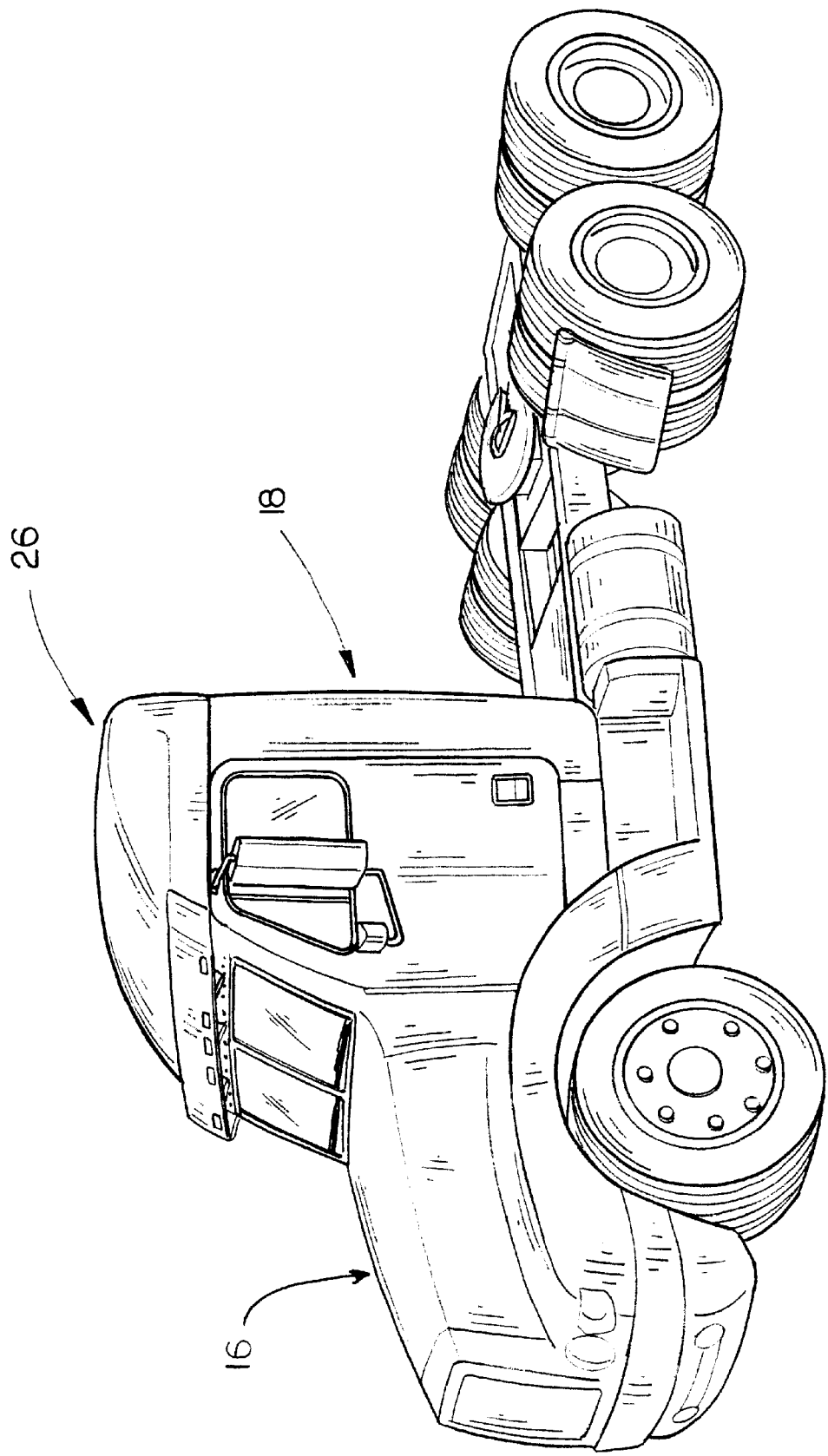
FIG. 1 is a front perspective view of a truck, having a raised-roof or condo sleeper, that has been converted to a mid-roof cab.
Figure 2:
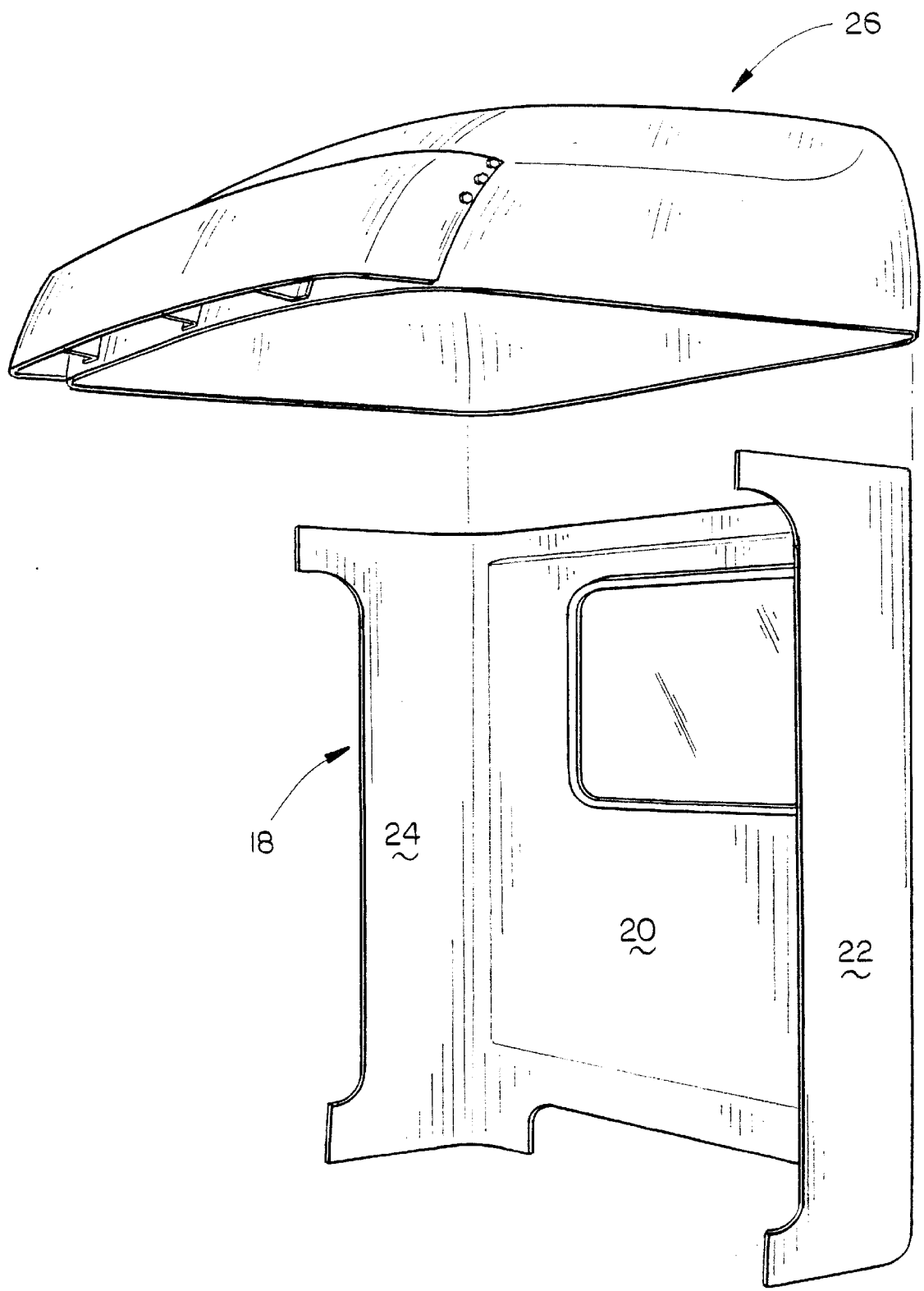
FIG. 2 is an exploded perspective view of the structure for converting the truck having a raised-roof or condo sleeper cab to a mid-roof cab.
Figure 3:
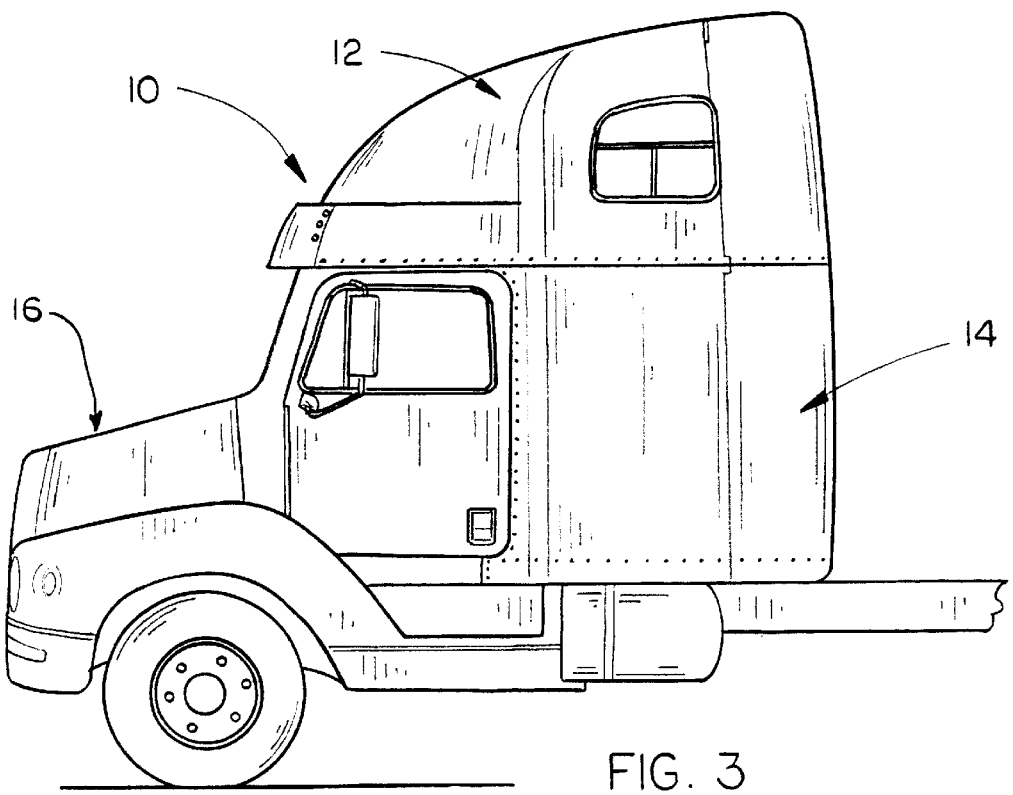
FIG. 3 is a side view of a truck having a raised-roof or condo sleeper.

In FIG. 3, the numeral 10 refers to a truck which is commonly referred to as a truck raised roof sleeper cab or a condo sleeper cab. For purposes of description, the truck 10 will be described as including a raised roof portion 12 and a sleeper compartment portion 14. The raised roof portion 12 is riveted to the upper forward portion of the driver's cab above the windshield and to the sides of the cab above the side windows of the cab. The sleeper compartment portion 14 is riveted to the sides of the cab rearwardly of the doors of the cab. The raised roof portion 12 and the sleeper compartment portion 14 are also riveted together.

Figure 4:
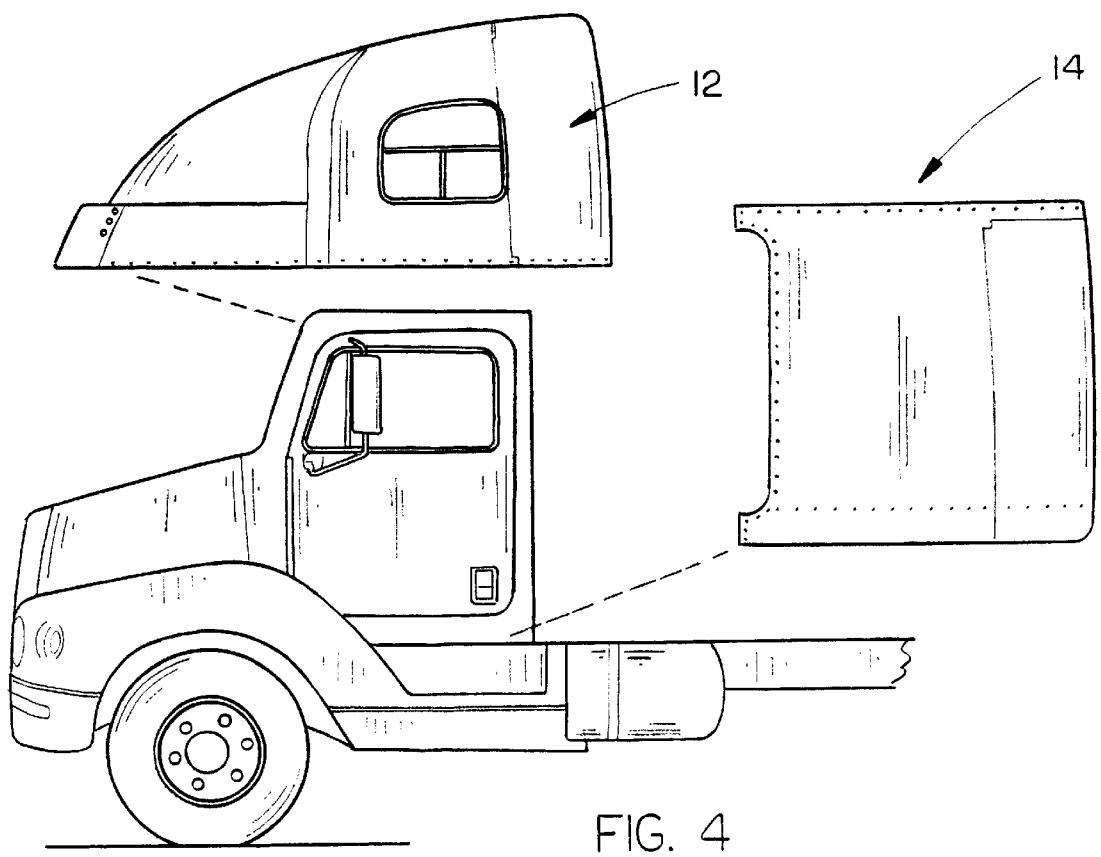
FIG. 4 illustrates the raised-roof and sleeper having been removed from the truck of FIG. 3.
Figure 5:
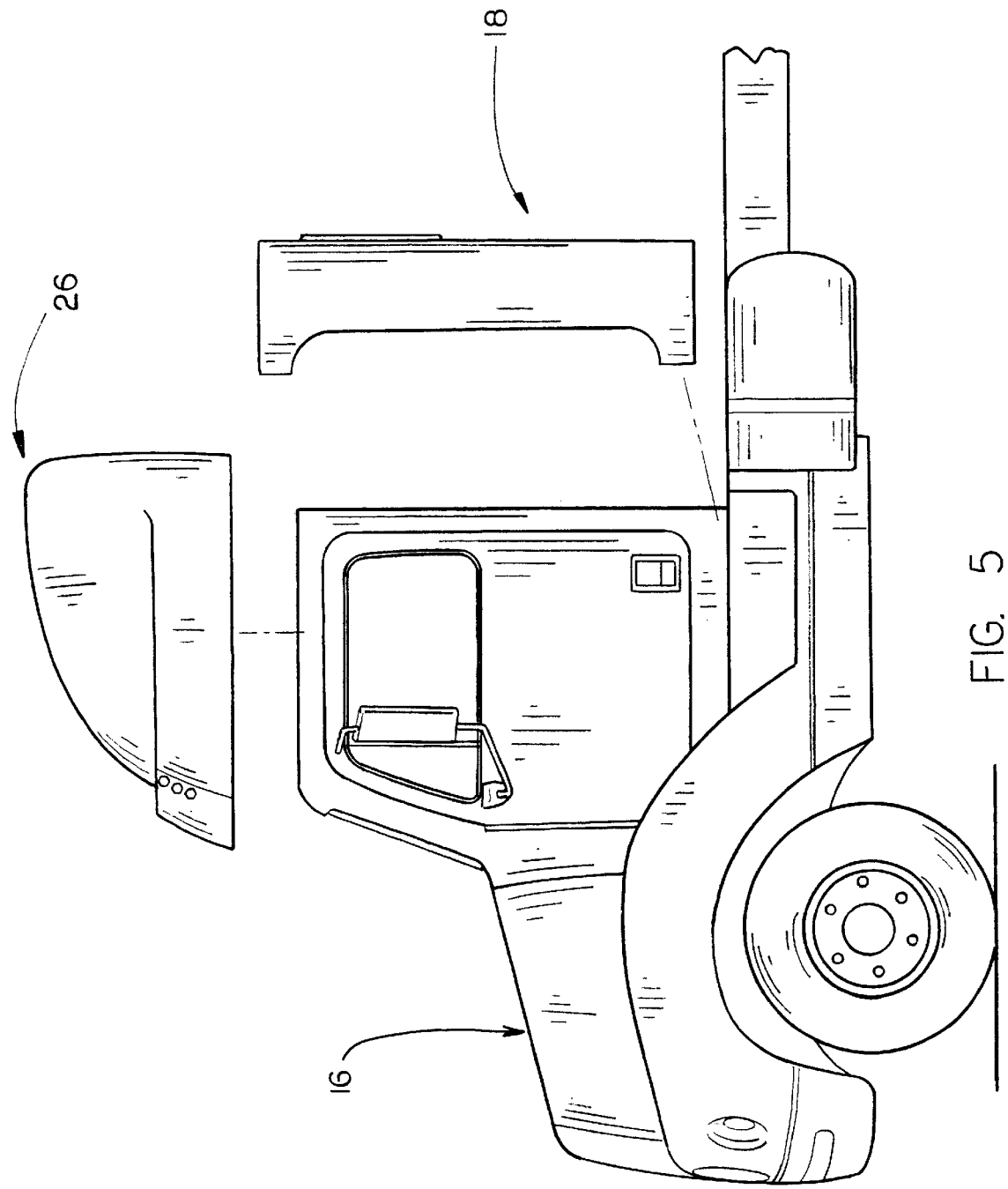
FIG. 5 illustrates the truck cab of FIG. 4 being converted to a mid-roof cab.
Figure 6:
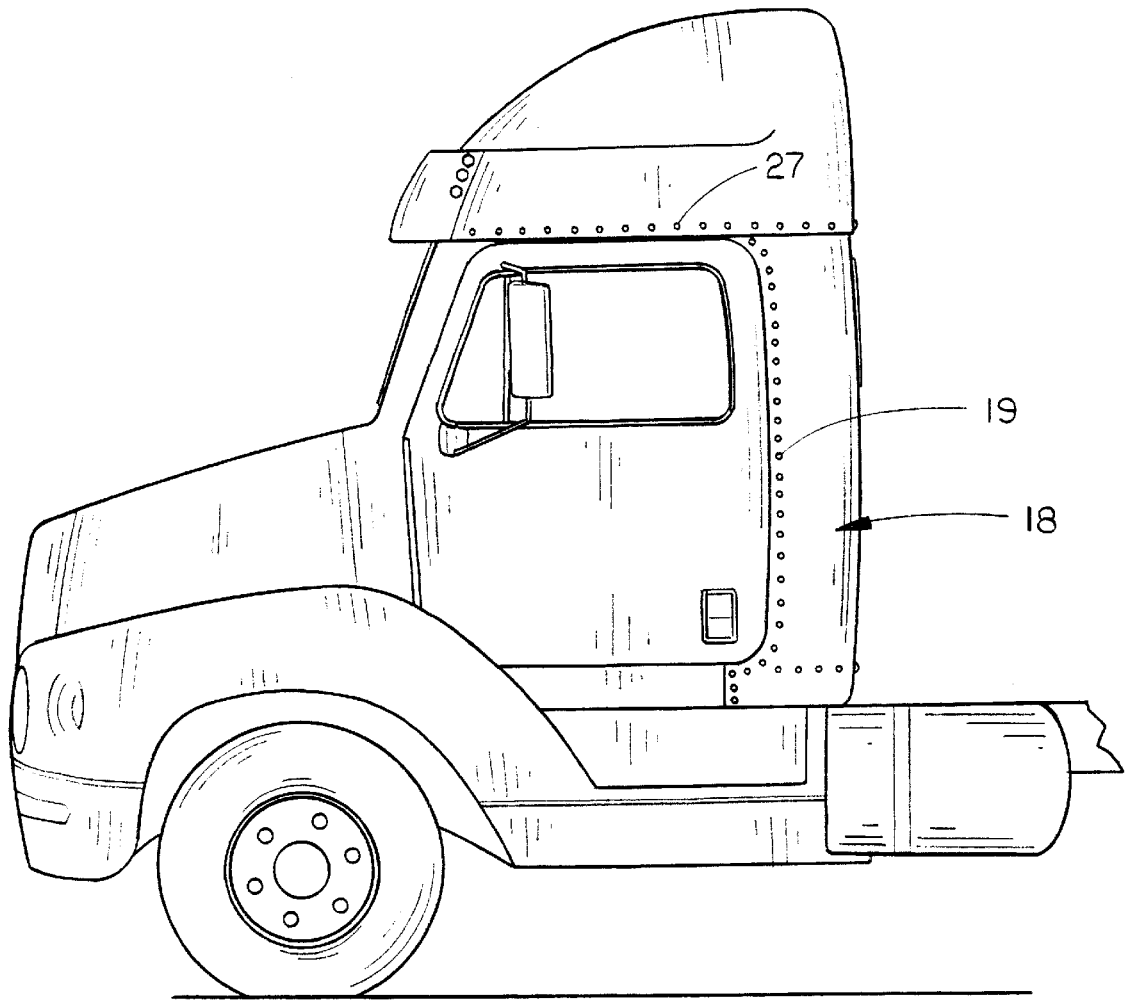
FIG. 6 is a side view of the converted truck cab.
Figure 7:
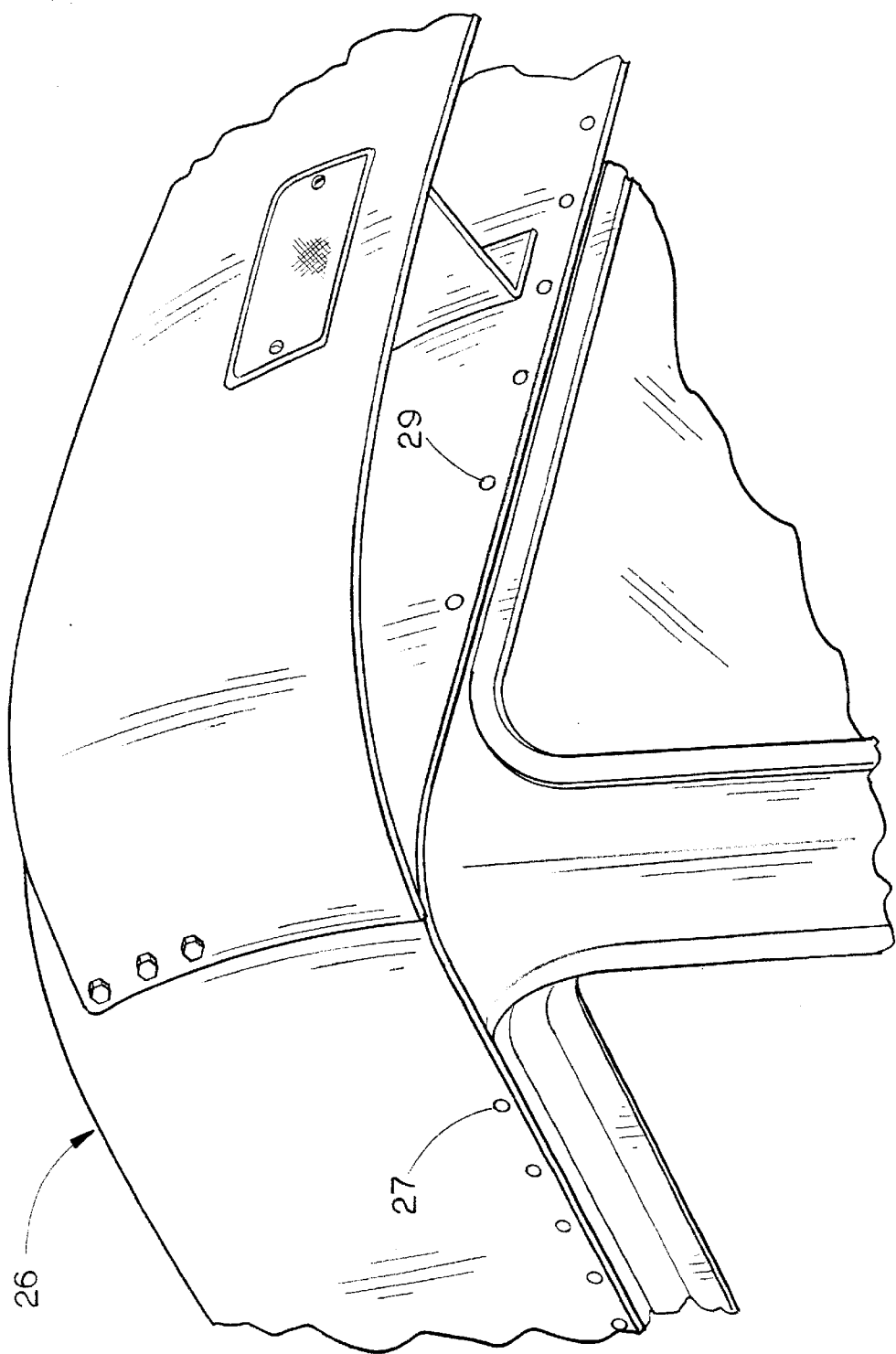
FIG. 7 is a partial front perspective view of the converted truck cab of FIG. 6.
Figure 8:
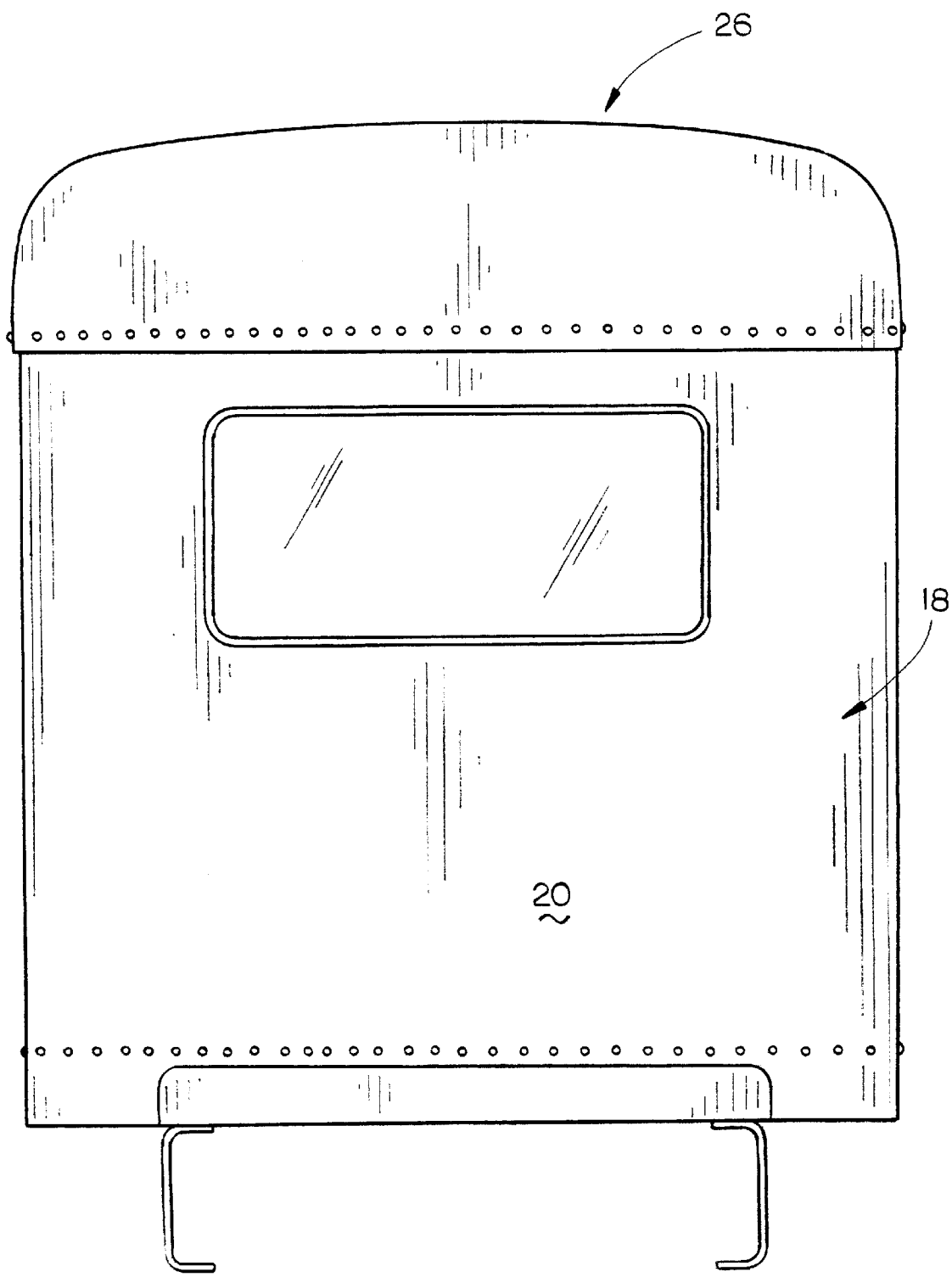
FIG. 8 is a rear view of the converted truck cab.

When it is desired to convert the truck raised roof sleeper cab to a mid-roof cab so that the truck will have a greater resale value on the used truck market, the raised roof portion 12 is removed from the truck cab 16 and the sleeper compartment 14 by removing the rivets connecting the same, as seen in FIG. 4. Although it is preferred that the raised roof portion 12 be removed from the truck cab 16 prior to the sleeper compartment portion 14 being removed therefrom, the raised roof portion 12 and the sleeper compartment portion 14 could be simultaneously removed from the truck cab 16 in one piece if so desired.

After the raised roof portion 12 has been removed from the truck cab 16, the sleeper compartment portion 14 is then removed from the truck cab 16. If the sleeper compartment portion 14 is connected the rear of the floor member of the operator's cab, that connection is also removed so that the entire sleeper compartment portion 14 may be removed from the truck. The removal of the raised roof portion 12 from the truck cab creates an opening in the roof of the truck cab 16 while the removal of the sleeper compartment portion 14 from the truck cab 16 creates an opening at the rearward end of the truck cab truck cab 16.

In the drawings, the numeral 18 refers to a fiberglass rear wall member which is riveted to the truck cab 16 rearwardly of the doors of the truck cab at 19 so as to provide a rear wall 20 and forwardly extending side walls 22 and 24 which close the opening formed in the rearward end of the truck cab 16. The numeral 26 refers to a fiberglass mid-roof member which is positioned over the cab and which is riveted to the cab above the doors thereof at 27 and above the windshield thereof at 29. The mid-roof member 26 is also riveted to the upper ends of the rear wall 20, side wall 22 and side wall 24. The mid-roof member 26 provides additional storage space and headroom within the cab as compared to a conventional day cab. When the rear wall member 18 and the mid-roof member 26 have been secured to the cab, the truck cab has the appearance of a mid-roof cab.

Thus, it can be seen that the invention accomplishes at least all of its stated objectives.

I claim:

1. The method of converting a truck raised roof sleeper cab to a mid-roof cab, comprising the steps of:

providing a truck cab having a raised roof sleeper cab including a raised roof positioned above the truck cab and a sleeper cab positioned rearwardly of the truck cab with the raised roof being secured to the sleeper cab;

removing the rivets which connect the raised roof sleeper cab to said truck cab;

removing the raised roof sleeper cab from said truck cab thereby creating a first opening at the rearward end of the truck cab and a second opening in the roof of the truck cab;

providing a rear wall member which resembles the rear wall of a mid-roof cab and which is designed to close the said first opening created at the rearward end of the truck cab;

securing said rear wall members to said truck cab to close said first opening;

providing a mid-roof member which resembles the roof of a mid-roof cab and which is designed to close the said second opening created in the roof of the truck cab;

securing said mid-roof member to said truck cab to close the said second opening;

and securing said mid-roof member to said rear wall member whereby the truck cab has the appearance of a mid-roof cab.

2. The method of claim 1 wherein said rear wall member is riveted to said truck cab.

3. The method of claim 1 wherein said mid-roof member is riveted to said truck cab.

4. The method of claim 2 wherein said mid-roof member is riveted to said truck cab and to said rear wall member.

5. The method of claim 1 wherein said mid-roof member and said rear wall member are comprised of a fiberglass material.

6. The method of claim 1 wherein said rear all member is provided with a series of protrusions extending therefrom which resemble heads of rivets.

7. The method of claim 1 wherein said raised roof is removed from said truck cab before said sleeper cab is removed from said truck cab.

8. The method of claim 1 wherein said raised roof sleeper cab comprises a condo sleeper cab.

9. The method of converting a truck raised roof sleeper cab to a mid-roof cab, comprising the steps of:

providing a truck cab having a raised roof sleeper cab including a raised roof positioned above the truck cab and a sleeper cab positioned rearwardly of the truck cab with the raised roof being secured to the sleeper cab;

removing the rivets which connect the raised roof sleeper cab to said truck cab;

removing the raised roof sleeper cab from said truck cab thereby creating a first opening at the rearward end of the truck cab and a second opening in the roof of the truck cab;

providing a conversion cab member which includes a rear wall portion and a mid-roof portion;

and securing said conversion cab member to said truck cab to close said first and second openings whereby the truck cab has the appearance of a mid-roof cab.

10. The method of claim 9 wherein said raised roof is removed from said truck cab before said sleeper cab is removed from said truck cab.

11. The method of claim 9 wherein said conversion cab member includes a rear wall member and a raised roof member and wherein said rear wall member is secured to said truck cab to close said second opening and wherein said raised roof member is secured to said truck cab to close said first opening.

12. The method of claim 11 wherein said raised roof member and said rear wall member are riveted to said truck cab and are riveted together.

* * * * *